United States Patent [19]
Elsaesser et al.

[11] Patent Number: 4,519,010
[45] Date of Patent: May 21, 1985

[54] DRIVING MECHANISM FOR MAGNETIC HARD DISC MEMORIES

[75] Inventors: Dieter Elsaesser, St. Georgen; Johann von der Heide, Moenchweiler; Rolf Müller; Georg Papst, both of St. Georgen, all of Fed. Rep. of Germany

[73] Assignee: Papst-Motoren GmbH & Co. KG, St Georgen, Fed. Rep. of Germany

[21] Appl. No.: 326,559

[22] Filed: Dec. 2, 1981

[30] Foreign Application Priority Data
Dec. 5, 1980 [DE] Fed. Rep. of Germany ....... 3045972

[51] Int. Cl.³ .............................................. G11B 5/12
[52] U.S. Cl. ................................. 360/97; 310/268; 360/98
[58] Field of Search .................. 360/97–99, 360/106, 107, 133; 310/268, 67 R, 68 R

[56] References Cited

U.S. PATENT DOCUMENTS

| | | | |
|---|---|---|---|
| 3,329,845 | 7/1967 | Lear | 310/67 R |
| 3,527,969 | 9/1970 | Papst | 310/51 |
| 4,034,411 | 7/1977 | Kraemer et al. | 360/98 |
| 4,216,512 | 8/1980 | Vidwans | 360/133 |
| 4,307,425 | 12/1981 | Kaneko et al. | 360/98 |
| 4,337,491 | 6/1982 | Hasler et al. | 360/97 |
| 4,363,046 | 12/1982 | Saito | 360/107 X |

FOREIGN PATENT DOCUMENTS 1596767 8/1981 United Kingdom .

Primary Examiner—John H. Wolff
Attorney, Agent, or Firm—Fitch, Even, Tabin & Flannery

[57] ABSTRACT

A driving mechanism for magnetic hard disc memories includes an isolated space for maximum cleanness, a driving motor mounted within the apparatus and having a stator and a rotor, the motor when energized having parts producing magnetic flux, a hub extending into the space of maximum cleanness for receiving therein at least one magnetic hard memory disc, a connection between the motor and the hub for driving the hub, a magnetic flux shield located between the parts producing the magnetic flux and the space of maximum cleanness, and the rotor being detachably connected to the rotor shaft.

25 Claims, 5 Drawing Figures

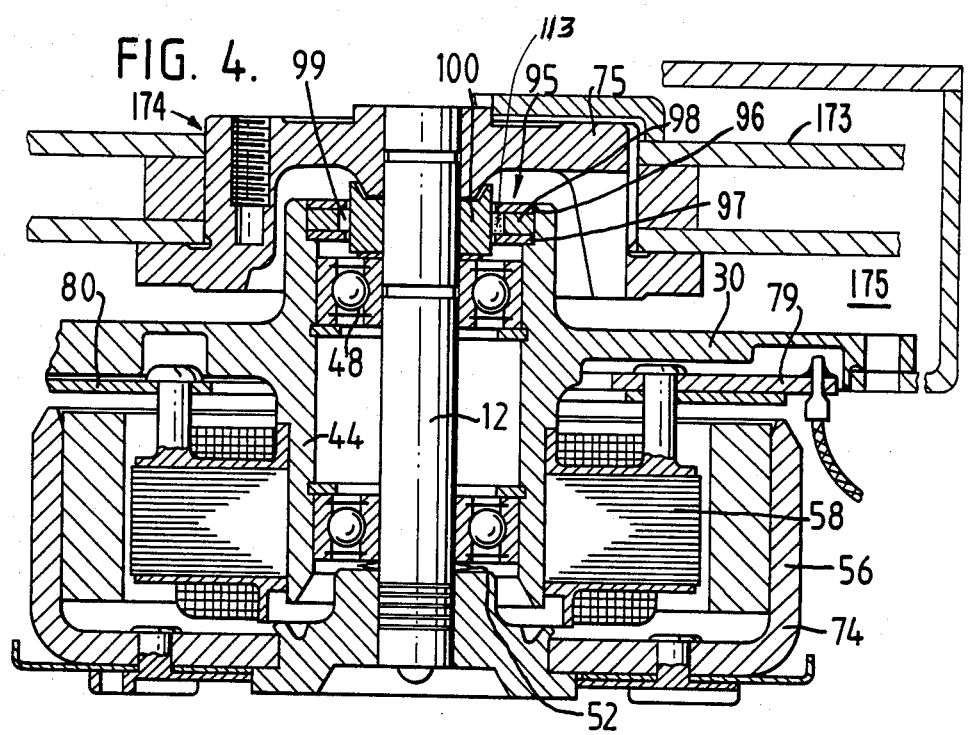
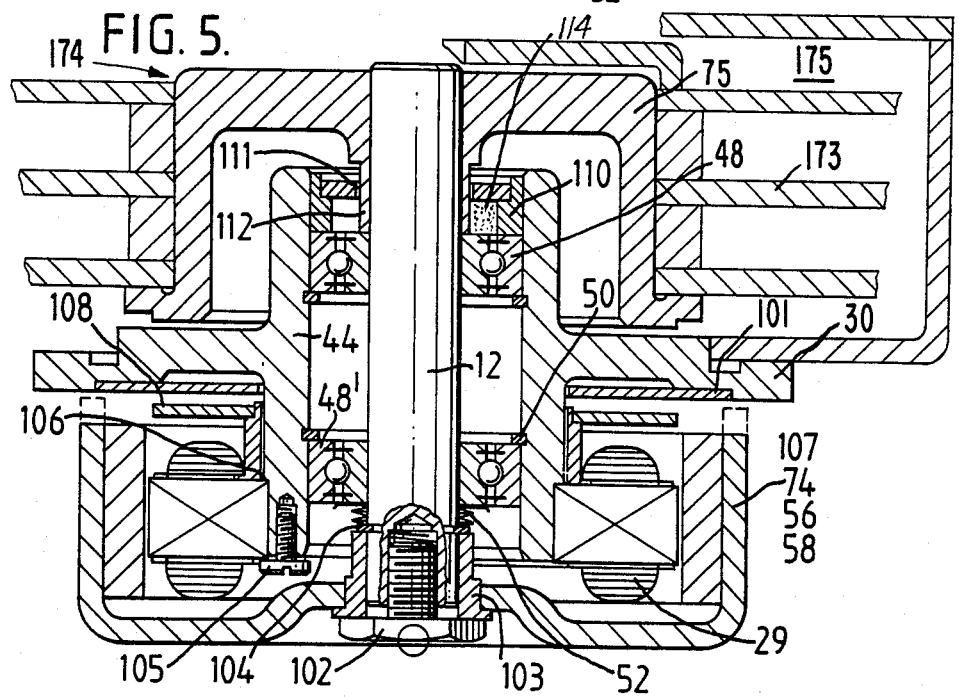

DRIVING MECHANISM FOR MAGNETIC HARD DISC MEMORIES

The invention relates to a driving mechanism for magnetic rigid or hard disc memories with a driving motor having a stator and a rotor for driving a hub for receiving at least one hard memory or storage disc and located within a first space of the device.

Hard memory discs are suitable for storing large quantities of data, which can be written or read out with the aid of a magnetic head arrangement if the disc is rotated with respect to the magnetic head arrangement.

In practice, it has been found that occasionally data stored on the hard memory disc are lost and/or problems occur when writing in or reading out the data.

The problem of the invention is to provide a driving mechanism for hard disc memories preventing data losses and avoiding problems during data input and output.

The invention is based on the finding that the cause of the aforementioned deficiencies can be magnetic fields emanating from the driving arrangements. These problems may be caused not only by high frequency fields, but also by low frequency fields. There can in particular be a demagnetization of the magnetic coating of the disc. As has been shown, the magnetic coating can be damaged even with fields above approximately 3 to 5 gauss.

According to the invention, the problem is solved in that a magnetic shield is arranged between the driving parts producing the magnetic fields and the portion of the first space intended for housing the hard memory disc. Such a shield makes it possible to prevent or at least considerably reduce leakages of the magnetically active motor part in the vicinity of the disc, so that also the static or low frequency magnetic field is reduced to harmless values in the vicinity of the discs.

Preferably, in the vicinity of the axial end of the magnetically active motor part there is a magnetic shielding zone and adjacent the other axial end of the motor is a ventilation zone which is sealed relative to the first area. Thus, on one side of the driving motor an area which is substantially free from magnetic interference fields is produced, while on the other side of the motor a zone is obtained which in the assembled condition is separated from the first area and between which there is a forced turbulence of the ambient air, desired for cooling purposes.

The driving motor is preferably designed as a brushless direct current external or outer rotor-type motor with a permanent magnetic rotor. In a circular rotor casing there is advantageously a one-part permanent magnetic ring or a permanent magnetic band with an approximately trapezoidal radial magnetization over the pole pitch which is bent in annular manner. The permanent magnets can be in particular plastic-bound magnets or so-called rubber magnets. Such magnets are made from mixtures of hard ferrites and elastic material, particularly barium ferrite combined with elastomer.

The hub can form part of the circular rotor casing. In such a way, the magnetic shield is appropriately located within the rotor casing, so that the permanent magnet of the outer rotor is preferably surrounded in bell-like manner by the magnetic shield and so that no magnetic stray fields can propagate in the direction of the hub and the hard memory discs located on the hub. To obtain a magnetic shield which on the one hand requires relatively little shielding material and on the other ensures a particularly effective suppression of the stray fields, the magnetic shield is appropriately partly formed by at least one shielding member rotating with the rotor and partly by at least one fixed shielding member.

The rotor casing can substantially be in the form of a bell, which is open on the face remote from the hub. If in such a case the rotor casing is made from magnetically non-conducting or poorly conducting material, the rotor bell is preferably at least partly lined with magnetic shielding material.

A driving mechanism of the aforementioned type generally comprises a speed control circuit and/or driving electronics, which in the case of a brushless direct current motor, particularly ensures the necessary commutation. If the magnetic shield also comprises a shielding ring connected to the motor stator, this ring can additionally be used for cooling the speed control circuit and/or driving electronics, particularly if semiconductor components are held in the thermally conductive contact with the shielding ring.

Instead of constructing the hub as part of the rotor casing, according to a modified embodiment of the invention the rotor casing can be shaped like a bell open towards the hub, a rotor which is concentric to the rotor casing being connected thereto on whose end remote from said casing is mounted the hub. The open rotor casing end is covered by means of a shielding plate.

On the face remote from the hub, the rotor preferably carries a fan for forming the ventilation zone. Such a construction is not only particularly simple, but also leaves the circumferential face of the rotor free as a braking surface for a brake which is frequently provided with such driving mechanisms.

The magnetic tracks of hard memory discs are extremely close to one another. Furthermore, despite the high precision, certain tolerances and eccentricities of the hard memory discs, the hub and/or the bearing system for the rotor shaft are unavoidable. As a result, on disassembling the rotor shaft, for example to service the motor, the alignment between the magnetic head arrangement and the magnetic tracks of the hard memory disc may be lost. A resulting misalignment leads to a loss of the data stored on the disc, so that the disc must be rewritten. In order to avoid such a data loss when parts of the drive, particularly components of the driving electronics or the speed control circuit or the stator winding fail, according to the invention at least certain parts of the stator and/or rotor are detachably connected to the rotor shaft, independently of the connection between the shaft and the hub. This makes it possible to replace defective drive parts without losing the reciprocal alignment between the magnetic head arrangement and the magnetic tracks on the hard memory disc. To make it unnecessary to obviate the need for entering the highly clean space or chamber containing the memory disc during such a replacement, the detachable parts of the stator and/or rotor are preferably accessible from the side of the driving mechanism remote from the hub.

In conformity with a further development of the invention a rotor shaft which is connected to the rotor casing, is mounted in a mounting tube which mounting tube is sealed against the space for housing the hard memory disc, in order to prevent the transfer of contaminant particles, e.g. oil or grease particles, from the bearing system into the clean space or chamber for receiving the hard memory disc or discs. In this respect magnetic fluid seals inserted into the mounting tube proved to be particularly effective; such magnetic fluid seals per se are known for example, under the trademarks Ferrofluidic seal (manufactured by the Ferrofluidics Corporation, Nashua, N.H., U.S.A.) and Magring seal (manufactured by the Servoflo Corporation, Lexington, Mass., U.S.A.). As to further particulars reference is made to the leaflet "Ferrofluidic Sealing Capabilities" by Ferrofluidic Corporation, 1979, and the following articles: Persson, N. C., "Tonic Prevents Computer Amnesia", *Design News*, Apr. 18, 1977; Bak, David J., "Magnetic Shaft Seal Protects Optical Encoder", *Design News*, Jan. 19, 1981; and Rosensweig, R. E., Miskolczy, G., and Ezekiel, F. D., "Magnetic-Fluid Seals", *Machine Design*, Mar. 28, 1968.

Functional members and/or mounting members, e.g. a magnetic flux conducting ring of a fluidic seal, preferably may be integrated into the mounting tube, e.g. integrally casted together with this tube.

When the rotor is designed as a permanent magnetic external rotor, the rotor casing advantageously may be detachably connected to the rotor shaft which is mounted in a mounting tube, and the stator lamination may be detachably mounted on the mounting tube. This permits replacement, if required, not only the rotor casing together with the permanent magnet or magnets, but also the stator lamination which carries the stator winding, without affecting the relative alignment between the magnetic head arrangement and the magnetic tracks of the hard memory disc. When the driving electronic unit and/or a speed control circuit is housed within the motor on a printed circuit board, this circuit board preferably is connected to the stator lamination so that the circuit board may be detached from the ring bearing together with the stator lamination.

The invention is described in greater detail hereinafter relative to preferred embodiments and the drawings, wherein:

FIG. 4 is a section through an embodiment which is identical to the embodiment of FIG. 2 with the exception of sealing means being provided in the mounting tube; and FIG. 5 is a section through a further modified embodiment of the invention comprising detachable rotor and stator members.

Figure 1:
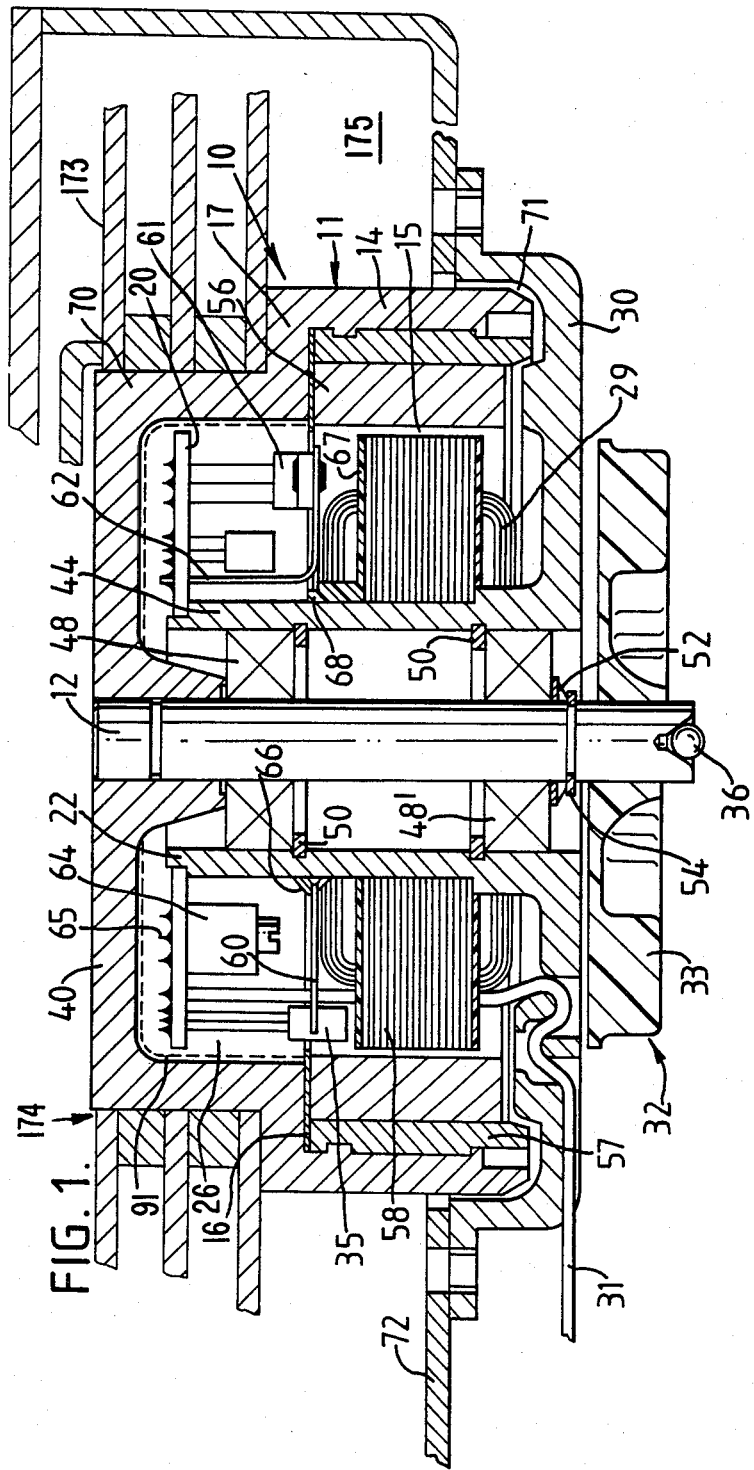
FIG. 1 is a section through an embodiment of the driving mechanism according to the invention.

The driving mechanism 10 illustrated in FIG. 1 has a brushless direct current motor 11 with a rotor casing 14 fixed to a rotor shaft 12 and concentric to the latter. A stator lamination 58 carrying a stator winding 29 forms part of the stator of motor 11. The stator lamination 58 surrounds a bearing tube 44 forming part of a central support 22. Rotor shaft 12 is mounted in bearing tube 44 with the aid of two bearings 48, 48', which are held in place by spaced retaining rings 50. A cup spring 52 bears on the bottom of bearing 48' and a retaining ring 54 located on rotor shaft 12, so that bearings 48, 48' are axially braced relative to one another. Together with an assembly flange 30, bearing tube 44 forms a one-piece die casting. As an alternative, the bearing tube 44 can be force-fitted into a hub joined to flange 30.

Rotor casing 14 not only surrounds the stator lamination 58, while forming a cylindrical air gap 15, but on the side remote from assembly flange 30 is axially extended so that hub 70 is obtained. Hub 70 is used for supporting and driving one or more hard storage discs 173 each having a central bore 174 whose diameter corresponds to the external diameter of hub 70. The discs can be commercial 5¼" or 8" discs. The illustrated construction makes it possible to adapt the diameter of driving hub 70 to the central bore 174 of the discs without taking account of the necessary drive power of motor 11 and the resulting most favorable diameter of air gap 15. A printed circuit board 20 is housed in the free space 26 within hub 70. The printed circuit board 20 is constructed in annular manner and is connected to the central support 22. The circuit board 20 carries the drive electronics and a speed control circuit, which includes, inter alia, a Hall IC 35 serving as a rotation position detector, output stage transistor 61 and a potentiometer 64. The soldered joints of the circuit components of the drive electronics and the speed control circuit, which are preferably produced in one operation, e.g. in a dip soldering process, are indicated at 65. Potentiometer 64 can be used, inter alia, for setting different operating points or for compensating component tolerances. It can be adjusted by means of a screwdriver via a bore (not shown) in flange 30 and one of the slots in stator plates 58. A line 31 leading to the printed circuit board 20 is connected to a d.c. voltage source. The side of circuit board 20 carrying the soldered joints 64 faces the base 40 of rotor casing 14.

In this embodiment, rotor casing 14 is made from a magnetically non-conducting or poorly conducting material, e.g. an aluminum alloy die casting. A plurality of continuous segments or a one-part permanent magnet 56 is fixed to the inner surface of rotor casing 14 facing stator plate 58. The permanent magnet is preferably made from a mixture of hard ferrite, e.g. barium ferrite and an elastic material, and thus forms a so-called rubber magnet. It is trapezoidally or approximately trapezoidally radially magnetized via the pole pitch with a relatively small pole clearance. A magnetic flux return ring 57 is located between the rotor casing 14 and the permanent magnet 56. It is fundamentally also possible to make the rotor casing 14 from magnetically conductive material, particularly soft iron, e.g. in the form of a deep drawn part. In such a case, there is no need for the soft iron flux return ring 57.

The magnetic flux return ring 57 is part of a magnetic shield, which also includes a shielding ring 16 and a further shielding ring 60. Shielding ring 16 is inserted between the face of permanent magnet 56 facing hub 70 and a shoulder 17 of rotor casing 14 and rotates together with the latter. However, shielding ring 60 is fixed. It is connected by means of brackets 62 to the circuit board 20 and is appropriately additionally fixed by means of fastenings or glued joints 66 to the ring bearing 44 in the vicinity of a collar 68 of the stator or via pins (not shown) to an end plate 67 of the stator. This prevents oscillating movements of the shielding ring 60.

Flux return ring 57 and the two shielding rings 16, 60 surround in bell-like manner the magnetically active part of driving mechanism 10. This effectively prevents the propagation of stray magnetic fields in the vicinity of the hard memory discs located on hub 70. It is not possible for there to be any significant penetration of the stray field through the annular clearance between shielding ring 16, 60 and the recesses of the shielding ring 60 for the passage of the Hall IC 35 or a plurality of such Hall IC's, because the soft magnetic shielding rings attract this field to them. In the represented embodiment, the fixed shielding ring 60 is simultaneously used as a heat sink for the output stage transistors 61 which are connected in thermally conductive manner to the shielding ring 60 by a full surface engagement. The cooling members of the output stage transistors 61 can, if necessary, be electrically insulated from shielding ring 60, e.g. by means of a mica disc or the like. It is also possible to subdivide the shielding ring 60 as a function of the number of output stage transistors 61 in order to obviate such an electrical insulation.

Assembly flange 30 makes it possible to mount driving mechanism 10 in the manner shown in FIG. 1 on a partition 72 which isolates an area 175 of maximum cleanness for receiving the hard memory disc 173. Dirt particles, grease vapors or the like which may emanate from bearing 48 consequently also have no detrimental action. The connection to the interior of the motor is provided only by a gap 71 between rotor casing 14 and assembly flange 30. This gap 71 is relatively long. In addition, one or more seals may optionally be provided in the vicinity of gap 71.

A fan 32 with fan blades 33 is fixed to the free end of rotor shaft 12 remote from hub 70. Fan 32 brings about an intense movement of the air in the vicinity of assembly flange 30, so that the latter is cooled. By means of bearing tube 44 and flange 30, heat due to energy losses from motor 11 is effectively conducted to the outside.

To prevent electric static charging of the rotor bell, which is detrimental to the operational reliability of the disc memory, rotor shaft 12 is electrically conductively connected to the apparatus shaft by means of a bearing ball 36 and a spring contact (not shown).

Figure 2:
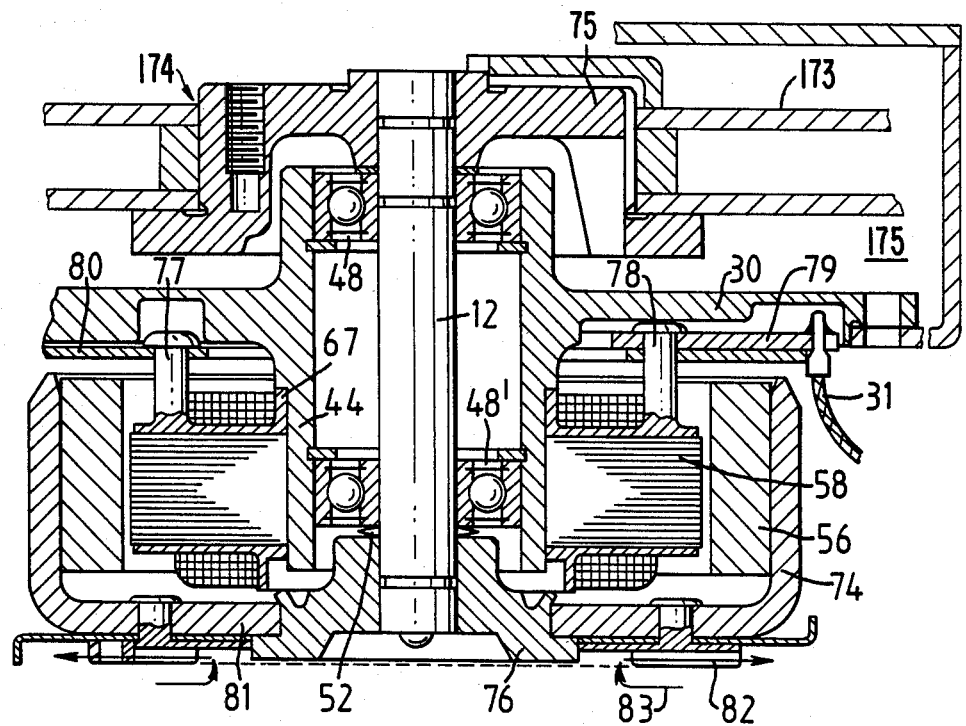
FIG. 2 is a section through a modified embodiment.

The embodiment of FIG. 2 functionally substantially corresponds to that of FIG. 1. A rotor casing 74 is shaped like a bell and opens out towards assembly flange 30. A hub 75, however, differing from the hug in the embodiment of FIG. 1, is separate from the rotor casing 74 and is fixed to the free end of the rotor shaft 12. In this embodiment, the rotor casing 74 is made from magnetically conductive material and is preferably deep-drawn. It is connected to the rotor shaft 12 by a hub body 76, which is pressed into the central opening of the rotor bell. The permanent magnet 56 directly engages the inner wall of the rotor casing 74. A printed circuit board 79 and a substantially flat shielding plate 80 are connected to the end plate 67 of the stator by means of brackets 77, 78. In conjunction with rotor casing 74, a shielding plate 80 prevents the escape of magnetic flux into the space taken up by the hard memory discs. In the same way as in the embodiment of FIG. 1, the steel ball bearing 48 offers a certain shielding action. Semiconductor components of the driving electronics and/or the speed control circuit which are not shown in FIG. 2 can be held in thermally conductive contact with the assembly flange and/or the shielding plate 80 for cooling purposes.

An axially flat radial impeller constructed as an injection molded part is fixed to the outside of base 81 or rotor bell 74 and in the manner indicated by arrows 83 draws air into the central area and discharge it radially outwards.

Figure 3:
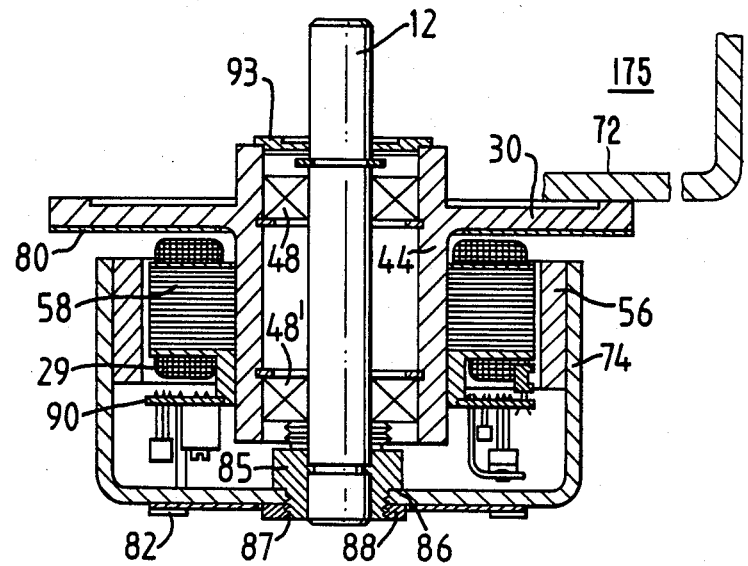
FIG. 3 is a section through a third embodiment similar to that of FIG. 2.

In the embodiment of FIG. 3, the bell-shaped rotor casing 74 is detachably connected to rotor shaft 12. For this purpose, a hub body 85, fixed to rotor shaft 12, has a seat 86 for the rotor bell and an external thread 87. A screw ring 88 can be screwed into the external thread 87 and, when so screwed, presses in detachable manner the rotor casing 74 against seat 86 of hub body 85. In a manner not shown, seat 86 can be a conical seat.

After detaching screw ring 88, for example, to work on the motor, the rotor casing 74 can be drawn off without there being any modification to the reciprocal alignment between the rotor shaft 12 or a hub corresponding to hub 75 according to FIG. 2 attached on the free end of the shaft and the magnetic head arrangement of the hard memory disc. After removing the rotor casing 74, access can be obtained to driving electronics and a speed control circuit located on a printed circuit board 90. If necessary, the printed circuit board 90 can be removed from the stator and replaced. If desired, the arrangement can also be such that stator lamination 58 can be removed from the bearing tube 44 together with the stator winding 29.

Of course, the above-described embodiments can, if necessary, be modified. For example, it is possible to provide the hub 70 of the arrangement of FIG. 1 with a magnetically shielding lining to the manner indicated by dotted lines at 91. FIG. 3 shows a seal 93 above bearing 48 and its function is to prevent any grease vapors or the like from bearing 48 from passing into the space 175 receiving the hard memory discs 173. A corresponding seal 93 is preferably also provided with the embodiment of FIG. 2. Seal 98 can appropriately be so constructed as a low friction lip seal. In place of this or in addition thereto, bearings 48, 48' can be constructed as sealed precision bearings.

In the case of a brushless direct current motor 11, it can advantageously be a single-phase direct current motor with an auxiliary reluctance torque (one or two-pulse) as disclosed in U.S. Pat. No. 3,873,897 or a three-phase direct current motor of the type described in the earlier dated West German application No. P 30 21 328.6. The idling speed of motor 11 can be 5,800 r.p.m. and the nominal speed, e.g. 3,600 r.p.m. Advantageously, the stator has four marked, wound poles, whose pole tips are deformed in such a way that in the vicinity thereof the width of the air gap 15 is modified and consequently the auxiliary reluctance torque is produced.

The embodiment of FIG. 4 substantially is identical to that of FIG. 2. However, in order to seal the bearing system of rotor shaft 12 relative to the space 175 receiving the hard memory disc or discs 173, a magnetic fluid seal 95 is inserted into the bearing tube 44 in the region between the hub 75 and the bearing 48. The magnetic fluid seal 95 consists of a pair of pole pieces 96, 97, a permanent magnet ring 98 positioned between the two pole pieces, and a magnetic liquid 113 which is introduced into an annular gap 99 between the magnet ring 98 and a sleeve 100 fixed to the rotor shaft 12. Such a seal is known under the trademark Ferrofluidic mentioned earlier. The seal 95 prevents contaminant particles moving from the bearing system into the chamber receiving the hard memory discs.

The embodiment of FIG. 5, in a manner similar to the embodiment of FIG. 2, comprises the rotor shaft 12 which carries the hub 75 at one of its ends, the rotor shaft being rotatably mounted by bearings 48, 48' in the bearing tube 44 which merges into the mounting flange 30. A shielding ring 101 is fixed to the lower surface of mounting flange 30 in concentric relationship relative to bearing tube 44. The rotor casing 74 and the permanent magnet 56 are detachably fixed to rotor shaft 12. For this purpose a screw 102 engages a central threaded bore at the lower end of the rotor shaft 12 (FIG. 5). The head of screw 102 engages a hub body 103 of the rotor casing 74 and urges the hub body against a securing ring 104. The latter is inserted into a circumferential groove at the rotor shaft 12. Cup springs 52 abut the opposite side of ring 104. The stator lamination 58 is detachably mounted on one end (in FIG. 5, the lower end) of mounting tube 44. The stator lamination 58 is urged against a shoulder 106 of the mounting tube 44 by screws 105 which are screwed into the lower end of the mounting tube 44. Only one of screws 105 is illustrated in FIG. 5. A body 107 which is connected to the stator lamination 58 carries at its free end (the upper end in FIG. 5) a printed circuit board 108 for the driving electronic unit and/or a speed control circuit.

By loosening the screw 102 the first rotor casing 74 together with the permanent magnet 56 may be removed from rotor shaft 12. Then, upon loosening of screws 105, the stator lamination 58 carrying stator winding 29, and the printed circuit board 108 likewise may be detached from bearing tube 44. The relative alignment between the magnetic head arrangement of the disc memory and the magnetic tracks of the hard memory discs mounted on the hub 75 is not affected thereby.

A sleeve 110 is pressed into the upper end of mounting tube 44 in the region between the upper bearing 48 and the hub 75. The sleeve 110 carries a permanent magnet ring 111. A magnetic liquid 114 is introduced into the gap between the permanent magnet ring 111 and an extension 112 of hub 75. This magnetic liquid together with magnet ring 111 defines a Magring seal (of Servoflo Corporation). This seal, in the same manner as seal 95 of the embodiment of FIG. 4, prevents the movement of grease or oil particles from the bearing system into the chamber receiving the hard memory discs.

The sleeve 110 need not be a separate member. Rather, it may be integrated into the bearing tube 44. In the embodiment of FIG. 4, at least the pole piece 97 may be integrally molded (casted) into the bearing tube 44.

As follows from FIG. 5, the rotor casing 74 in this embodiment does not carry blower blades or the like. In view of the high speed of rotation of the rotor casing 74 used in the case of a hard disc memory, a considerable ventilation effect is obtained by the rotation of this casing.

In order to further improve the magnetic shielding effect, the rotor casing 74, as indicated in FIG. 5 by dashed lines, may protrude beyond the permanent magnet 56 and extend closely up to the magnetic shielding ring 101.

The invention is applicable with advantage at motors for machines with removable disks, so-called cartridges, also. There is still, also a need for a non-removable motor shaft, all the more as in some cases in one machine might be used a fixed disk and one (or more) removable disk(s) together. It might be advantageous also with respect to floppy disk systems.

Although the invention has been described in connection with a preferred embodiment and certain alternative embodiments, other alternatives, modifications, and variations may be apparent to those skilled in the art in view of the foregoing description. Accordingly, it is intended to embrace all such alternatives, modifications, and variations as fall within the spirit and scope of the appended claims.

What is claimed is:

1. A driving mechanism for magnetic hard disc memory having a read/write head, comprising:
   means in said mechanism isolating an enclosed space for maximum cleanness;
   a brushless direct current driving motor mounted within said driving mechanism and having a stator, including a stator lamination, and a rotor, said rotor being a permanent magnet outer rotor having a bell-shaped rotor casing and at least one permanent magnet fixed in the rotor casing, said motor when energized having parts producing magnetic flux;
   a rotor shaft mounting said rotor, said shaft being mounted by bearing means in said driving mechanism;
   a hub extending into the isolated enclosed space of maximum cleanness for receiving therein at least one magnetic hard memory disc having magnetic tracks with which the read/write head aligns in a reciprocal alignment relationship;
   means connecting said motor and said hub for driving said hub;
   means forming a magnetic flux shield and located between the parts producing the magnetic flux and the isolated enclosed space of maximum cleanness; and
   means detachably connecting the rotor to the rotor shaft independently of said means connecting said motor and said hub, whereby said rotor is removable from said rotor shaft without affecting the reciprocal alignment between the read/write head and the magnetic tracks of the hard memory disc.

2. A driving mechanism in accordance with claim 1 wherein said means detachably connecting the rotor are accessible from the side of the driving mechanism remote from the hub.

3. A driving mechanism in accordance with claim 1 wherein the permanent magnet includes a permanent magnet circular band having an approximately trapezoidal radial magnetization.

4. A driving mechanism in accordance with claim 3 wherein the permanent magnet comprises a ferrite, particularly barium ferrite combined with an elastomer.

5. A driving mechanism in accordance with claim 4 wherein the rotor shaft connected to the rotor casing is mounted in a bearing tube concentric with the shaft.

6. A driving mechanism in accordane with claim 5 and further comprising means for sealing the bearing tube against the space of maximum cleanness, said sealing means including a magnetic fluid seal inserted into at least a portion of the bearing tube.

7. A driving mechanism in accordance with claim 5 wherein the stator lamination is also detachably mounted.

8. A driving mechanism in accordance with claim 5 further comprising a printed circuit board mounting electronic circuitry components, said printed circuit board being connected to the stator lamination and being detachably mounted together with the stator lamination.

9. A driving mechanism in accordance with claim 8 wherein said means detachably connecting the rotor includes thread means.

10. A driving mechanism in accordance with claim 9 wherein said thread means is located at the end of the shift remote from the hub.

11. A driving mechanism in accordance with claim 10 wherein said thread means is an integral part of the shaft end.

12. A driving mechanism for magnetic hard disc memory, comprising:
  means in said mechanism isolating an enclosed space for maximum cleanness;
  a brushless direct current driving motor mounted within said mechanism and having a stator including a stator lamination and a rotor, said rotor being a permanent magnet outer rotor having a bell-shaped casing and at least one permanent magnet fixed in the rotor casing, said motor when energized having parts producing magnetic flux;
  a rotor shaft mounting said rotor, said shaft being mounted by bearing means in said mechanism;
  a hub extending into the isolated enclosed space of maximum cleanness for receiving therein at least one magnetic hard memory disc;
  means connecting said motor and said hub for driving said hub;
  means forming a magnetic flux shield and located between the parts producing the magnetic flux and the isolated enclosed space of maximum cleanness, the rotor casing being connected to a rotor shaft concentric thereto in the motor, and the shaft extending beyond the bell opening of the rotor casing to receive the hub on its outer end remote from the rotor casing, the magnetic flux shield being in the form of a flat shielding ring lying in a plane that extends radially from the motor axis; and
  semi-conductor components forming at least a part of a speed control circuit and driving electronics of said motor wherein at least one of the semi-conductor components is mounted in thermally conducting contact with the flat shielding ring.

13. A driving mechanism in accordance with claim 12 wherein the rotor shaft is mounted in a bearing tube concentric therewith, said bearing tube being connected to a motor assembly flange, said flat shielding plate being mounted to the assembly flange.

14. A driving mechanism in accordance with claim 13 wherein the motor assembly flange carries a printed circuit board containing the speed control and driving electronics, the shielding plate being positioned adjacent the printed circuit board.

15. A driving mechanism in accordance with claim 14 wherein a motor shaft forms part of said rotor and is mounted in a bearing system within said bearing tube and the rotor and at least parts of the stator are detachably connected to the rotor shaft independently of any connection with the hub.

16. A driving mechanism in accordance with claim 15 wherein the detachable parts of the stator and the rotor are accessible from the side of the driving mechanism remote from the hub.

17. A driving mechanism in accordance with claim 16 further comprising a magnetic fluid seal inserted into a portion of the bearing tube.

18. A driving mechanism in accordance with claim 17 wherein the functional or mounting members or both of the magnetic fluid seals are integrated into the bearing tube.

19. A driving mechanism in accordance with claim 12 wherein the rotor casing is made from magnetically conductive material and forms a part of the means forming the magnetic flux shield.

20. A driving mechanism for magnetic hard disc memory comprising:
  means in said mechanism isolating an enclosed space for maximum cleanness;
  a brushless direct current driving motor mounted within said mechanism and having a stator including a stator lamination and a rotor, said rotor being a permanent magnet outer rotor having a bell-shaped rotor casing and at least one permanent magnet fixed in the rotor casing, said motor when energized having parts producing magnetic flux;
  a hub extending into the isolated space of maximum cleanness for receiving therein at least one magnetic hard memory disc;
  means connecting said motor and said hub for driving said hub;
  means forming a magnetic flux shield and located between the parts producing the magnetic flux and the isolated enclosed space of maximum cleanness, said means forming the magnetic flux shield being located adjacent one axial end of the parts producing the magnetic flux and within the rotor casing, said hub being a part of the circular rotor casing and said means forming the magnetic flux shield being located within the rotor casing.

21. A driving mechanism in accordance with claim 20 wherein the permanent magnet of the outer rotor is surrounded in bell-like manner by said means forming the magnetic flux shield.

22. A driving mechanism in accordance with claim 21 wherein said means forming the magnetic flux shield includes one shielding member mounted to rotate with the rotor and at least one stationary shielding member 23. A driving mechanism in accordance with claim 22 wherein the rotor casing is made from magnetically substantially non-conductive material, the permanent magnet being enveloped by a magnetic flux return ring forming part of the magnetic shield and at least one additionally magnetic shielding member extending substantially radially in the rotor casing.

24. A driving mechanism in accordance with claim 23 wherein said shielding member mounted to rotate with the rotor comprises a shielding ring mounted with the rotor casing, said shielding ring lying in a plane that extends radially outwardly from the motor axis, said shielding ring being inserted between the edge of the permanent magnet adjacent the hub and a shoulder of the rotor casing wall.

25. A driving mechanism in accordance with claim 24 wherein the stationary shielding member includes a shielding ring lying in a plane that extends radially from the motor axis, said stationary shielding ring being located adjacent the stator.

* * * * *

UNITED STATES PATENT AND TRADEMARK OFFICE
CERTIFICATE OF CORRECTION

PATENT NO. : 4,519,010

DATED : May 21, 1985

INVENTOR(S) : Elsaesser et al.

It is certified that error appears in the above-identified patent and that said Letters Patent is hereby corrected as shown below:

```
Col. 4, Line 4, after "173" insert --,-- (comma).
Col. 5, Line 59, "or" should be --of--.
Col. 6, Line 20, "to" should be --in--.
Col. 6, Line 37, after "e.g." insert --,-- (comma).
Col. 8, Line 4, "for" should be --of--.
```

Signed and Sealed this

Twenty-ninth Day of April 1986

[SEAL]

Attest:

DONALD J. QUIGG

Attesting Officer

Commissioner of Patents and Trademarks